E. R. EVANS.
VARIABLE SPEED WINCH.
APPLICATION FILED JUNE 4, 1917.

1,272,785.

Patented July 16, 1918.
4 SHEETS—SHEET 3.

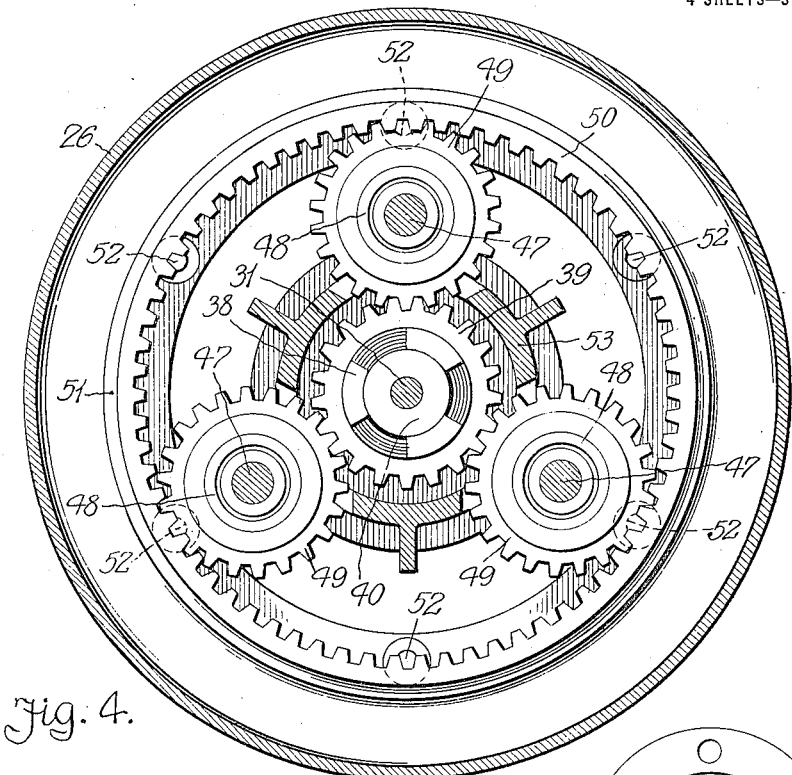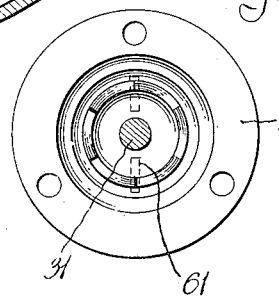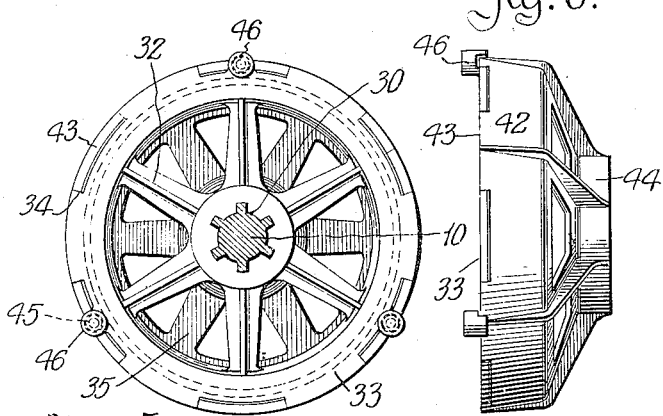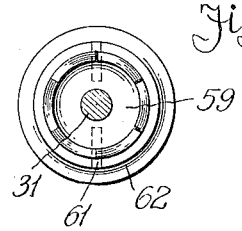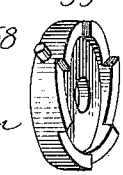

UNITED STATES PATENT OFFICE.

EDWIN R. EVANS, OF DETROIT, MICHIGAN.

VARIABLE-SPEED WINCH.

1,272,785. Specification of Letters Patent. Patented July 16, 1918.

Application filed June 4, 1917. Serial No. 172,578.

*To all whom it may concern:*

Be it known that I, EDWIN R. EVANS, a citizen of the United States of America, residing at Detroit, in the county of Wayne and State of Michigan, have invented certain new and useful Improvements in Variable-Speed Winches, of which the following is a specification, reference being had therein to the accompanying drawings.

This invention relates to tractors, and is one of a series of tractor improvements that will include a change speed gear transmission mechanism, a spring suspension, a rear axle construction, and a trailer draw bar.

The present invention relates to a work shaft or member adapted to be driven from the power plant of a tractor, and the object of my invention is to make this work shaft or member a part of the change speed transmission gear mechanism and provide the work shaft with a novel winch or drum, and provision is made for operating the winch at various speeds. The winch can be used for various purposes, for instance, extricating a tractor from a difficult position, and since the work shaft or member can be driven at various speeds, it is obvious that this same shaft can be used for operating various kinds of farm machinery when the change speed gear mechanism is set to transmit power to the work shaft or member instead of the traction wheels of the tractor.

A further object of my invention is to provide a variable speed winch or drum wherein the parts are constructed in view of reducing the cost of manufacture and at the same time retain those features by which durability, ease of assembling and power efficiency is secured. With such ends in view, my invention resides in the construction to be hereinafter described and then claimed.

Reference will now be had to the drawings, wherein—

Fig. 4 is a similar view taken on the line IV—IV of Fig. 1;

Fig. 5 is an elevation of a winch clutch;

Fig. 6 is a side elevation of the same;

Fig. 7 is an elevation of an inner clutch member;

Fig. 8 is a similar view of an outer clutch member, and

Fig. 9 is a perspective view of a portion of the inner clutch member.

Figure 1:
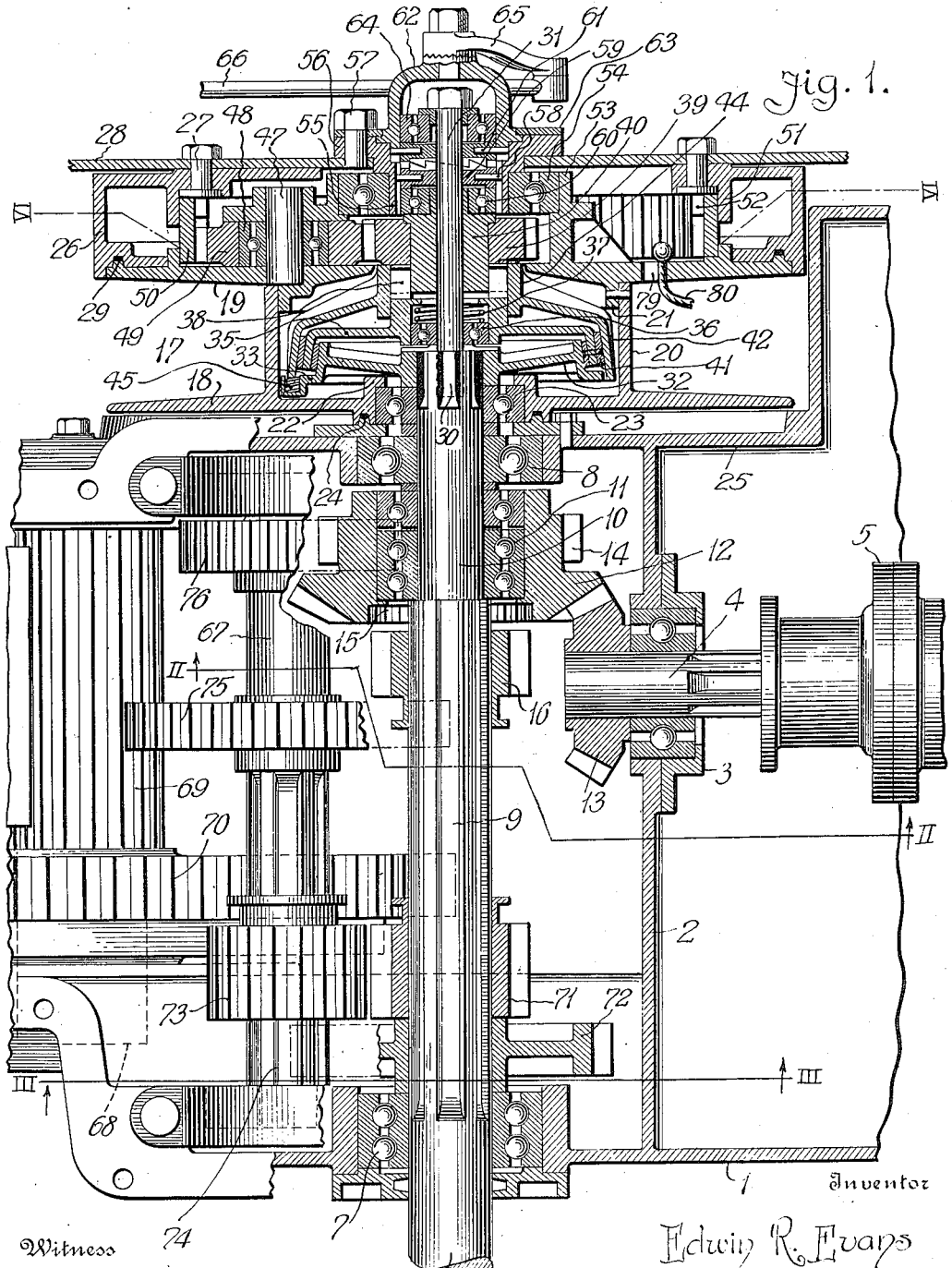
Figure 1 is a horizontal sectional view of the variable speed winch, showing the change speed gear transmission mechanism, partly in plan and partly in section.
Figure 2:
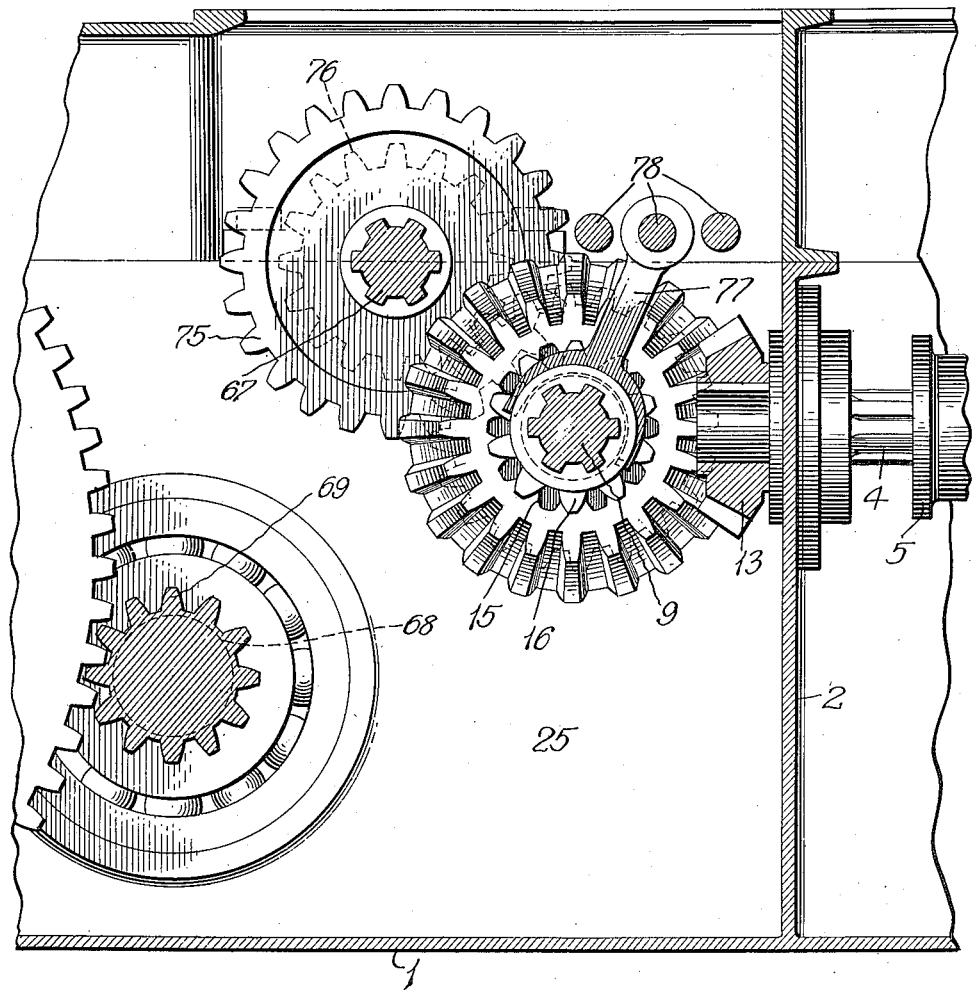
Fig. 2 is a longitudinal sectional view taken on the line II—II of Fig. 1.
Figure 3:
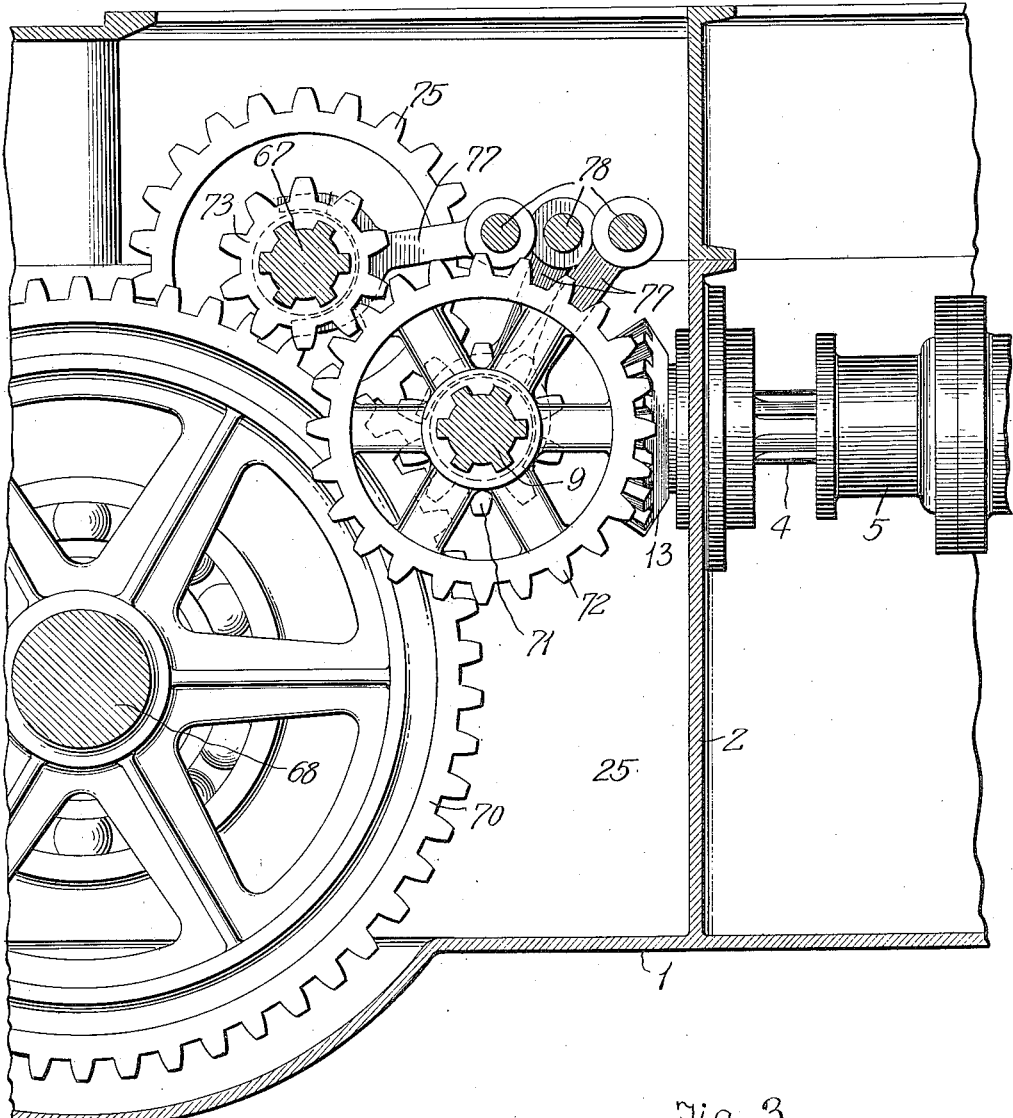
Fig. 3 is a similar view taken on the line III—III of Fig. 1.

In describing my invention by aid of the views above referred to I desire to point out that the same are intended as merely illustrative of the mechanism as now actually embodied in a tractor, and I do not care to confine my invention to the precise construction and arrangement of parts shown. The following description is therefore to be broadly construed as including such substitute constructions and arrangement of parts which are the obvious equivalent of those to be hereinafter referred to.

In the drawings, the numeral 1 generally denotes a housing having a transverse wall 2 thereof provided with an anti-frictional bearing 3 for an engine driven shaft 4 and associated with said shaft is a conventional form of clutch mechanism 5 which permits of a tractor engine being operated without imparting power to the tractor or mechanism thereof.

6 denotes a transverse work shaft and this shaft is journaled in anti-frictional bearings 7 and 8 carried by longitudinal walls of the housing 1. The shaft 6 has a splined portion 9 and a cylindrical portion 10. On the cylindrical portion 10 is an anti-frictional bearing 11 for a loose beveled gear wheel 12 meshing with a small beveled gear wheel 13 on the engine driven shaft 4. The hub portion of the beveled gear wheel 12 constitutes a gear wheel 14 and concentric of the beveled gear wheel 12 is an internal clutch member or gear 15 adapted to be engaged by a slidable gear 16 on the splined portion 9 of the work shaft 6. With the slidable gear 16 in engagement with the internal gear 15 of the beveled gear wheel 12, the engine driven shaft 4 is adapted to impart a rotary movement to the work shaft 6.

17 generally denotes a winch composed of heads 18 and 19, the former having a drum 20 fixed relative to a collar 21 of the head 19. The head 18 has a hub portion 22 rotatable on an antifrictional bearing 23 on the cylindrical portion 10 of the work shaft 6, and a suitable packing or flange 24 is between the winch head 18 and the wall 25 of the housing 1. The winch head 19 is rotatable relative to a cylindrical casing 26 fixed by bolts and nuts, generally designated 27, to a support 28 that is stationary and preferably held by parts of the housing 1. Suitable packing or flange 21 may be interposed between the winch head 19 and the casing 26.

30 denotes a small spline portion of the work shaft 6 and said shaft terminates in a stem 31 axially of the drum 20. Fixed on the small spline portion 30 of the work shaft 6 is the hub portion of an inner friction clutch member 32 having a rim 33 provided with notches 34. The rim 33 is angular in cross section so as to provide a friction gripping surface for an intermediate friction clutch member 35 that is slidable relative to the stem 31. The hub portion of the intermediate member 35 is slidable on an antifrictional bearing 36 carried by the stem 31 and the hub portion is cupped out to receive the antifrictional bearing 36, also a coiled compression spring 37 tends to hold the intermediate member 35 normally separated from the inner member 32. The hub portion of the intermediate member 35 has segmental teeth 38 engaging similar teeth of the hub portion of the central gear wheel 39, said central gear wheel 39 being rotatable on a collar 40 slidable on the stem 31.

41 denotes inner and outer shoes carried by the intermediate member 35 and the inner shoe is adapted to engage the rim 33 of the inner member 32, while the outer shoe is adapted to engage an outer friction clutch member 42 having the rim thereof provided with lugs 43 adapted to engage in the notches 34. The lugs 43 and the notches 34 establish a driving relation between the inner and outer members 32 and 42, and the outer member 42 has a hub portion 44 slidable on the hub portion of the member 35 and the central gear wheel 39, the hub portion 44 of the member 42 engaging the face of the gear wheel 39. The outer friction clutch member 42 is held in a retracted position relative to the inner friction clutch member 32 by a plurality of coiled compression springs 45 in pockets 46 carried by the rim of the inner friction clutch member 42, these pockets being best shown in Figs. 5 and 6 of the drawing.

47 denotes studs within the casing 26, carried by the head 19 of the winch 17 and these studs are provided with anti-frictional bearings 48 for a plurality of planetary gears or pinions 49 meshing with an internal rack 50. The internal rack is set in an annular flange 51 of the casing 26 and is held against rotation by reduced ends 52 of the bolts 27, said reduced ends extending between the teeth of the internal rack 50, as best shown in Fig. 4.

53 denotes a hub portion of the winch head 19 and, as shown in Fig. 4, this hub portion is cut away to provide clearance for the planetary gears or pinions 49. The hub portion 53 carries the outer race member of an anti-frictional bearing 54 and the inner race member of said bearing is fixed to the sleeve 55 of an inner clutch member 56 secured to the support 28, as at 57. The inner wall of the sleeve 55 has longitudinal grooves to receive radially disposed pins and studs 58 of a clutch 59, said clutch surrounding the stem 31 with an anti-frictional bearing 60 interposed between the collar 40 and the sleeve 55, the anti-frictional bearing 60 also being located between the end of the clutch 59 and the body of the collar 40. The pins or studs 58 hold the clutch against rotation relative to the sleeve 55 and normally engaging the clutch 59 is a similar outer clutch 61 held against rotation in a rotatable outer clutch member 62, said member being held for rotation on the member 56 by a plate 63 secured to the member 56. An anti-frictional bearing 64 is interposed between the outer rotatable clutch member 62 and the stem 31.

65 denotes a crank fixed relative to the outer rotatable clutch member 62 and pivotally connected to said crank is an operating rod 66.

67 and 68 denote power transmission shafts journaled in the housing 1 and the shaft 68 has a wide gear wheel 69 adapted for transmitting power to the wheels of a tractor. The shaft 68 also has a large gear wheel 70 and adapted to mesh therewith is a small double gear 71 on the spline portion 9 of the work shaft 6. Fixed on the spline portion 9 of the work shaft 6 is a gear wheel 72 adapted to be engaged by a shiftable gear 73 slidable on a spline portion 74 of the shaft 67. The shaft 67 has other fixed gear wheels 75 and 76, the former adapted to be engaged by the shiftable gear 16 and the latter by the gear 14 of the beveled gear wheel 12.

77 denotes shifting arms loosely engaging the hub portions or spools of the shiftable gears 16, 71 and 73, and these shifting arms are carried by reciprocable rods 78 extending transversely of the housing 1, said rods and the shifting arms constituting conventional means of adjusting shiftable gears to obtain various speeds, in connection with the tractor or the winch 17 carried thereby. Since that end of the work shaft 6 opposite the winch 17 can be provided with a power transmission wheel, it is apparent that all kinds of farm machinery can also be operated at variable speeds.

Considering the shaft 4 in operation, the speeds for the tractor proper are as follows:—By shifting the gear 73 into mesh with the gear 70, reverse speed is obtained with the shaft 67, gear 76, gear 14, and beveled gear wheels 12 and 13. By shifting the gear 73 into engagement with gear 72 and gear 71 into engagement with the gear 70, low speed is obtained through beveled gear wheels 13 and 12, gears 14 and 76, shaft 67, and gear 73 to gear 72, work shaft 6 and gear 71 to gear 70.

Intermediate speed is obtained by shifting the gear 16 into mesh with the internal gear 15 of the beveled gear wheel 12 and gear 71 into mesh with gear 70. The beveled gear wheel 12 is fixed to gear 16 to rotate the work shaft 6 which transmits power to the gear wheel 70. High speed is obtained by shifting the gear 16 into engagement with gear 75 and the gear 71 into engagement with gear 70. Then power is transmitted from the beveled gear wheels 13 and 12 to the gears 14 and 76, shaft 67 to gear wheels 75 and 16, work shaft 6 to gear wheels 71 and 70.

To place the winch 17 in operation, at any of the speeds above specified, the rod 66 is shifted to partially rotate the outer clutch member 62. As the clutch within the outer clutch member 62 is fixed against reciprocation or rotation, and the clutch 59 engages the clutch 61, it is apparent that the clutch 59 will be forced inwardly, sliding in the sleeve 55. As this takes place, the collar 40 and the central gear 39 are shifted inwardly on the stem 31, moving the outer and intermediate friction clutch members 42 and 35 in synchronism. The shoes 41 of the intermediate clutch member 35 establish a driving relation between the outer and inner friction clutch members 42 and 32, consequently a rotary movement will be imparted to planetary gears 49 and as these gears mesh with the stationary internal rack 50, it is obvious that the winch 17, including the heads 18 and 19, will be revolved.

The head 19 of the winch 17 has a bayonet slot 79 and the end of a cable or rope 80 can be easily anchored therein so that the cable or rope may be wound and unwound on and off of the winch 17.

It is thought that the operation and utility of the variable speed winch will be apparent without further description, and while I have herein shown and described a preferred form of change speed gear transmission mechanism, it is to be understood that the winch may be operated by other mechanisms than those herein referred to.

What I claim is:—

1. In a tractor, a work shaft, a change speed gear transmission mechanism for said work shaft, and a winch containing means adapted to establish driving connection between said work shaft and said winch.

2. In a tractor, a work shaft, a change speed gear transmission mechanism for said work shaft, a winch adapted to be operated by said work shaft and a planetary reduction gear in a portion of said winch adapted to reduce the speed thereof relative to said work shaft.

3. In a tractor, a work shaft, a change speed gear transmission mechanism for said work shaft, a winch, a reduction gearing in a portion of said winch adapted for operation by said work shaft to revolve said winch, and a clutch mechanism adapted to fix said reduction gearing relative to said work shaft for operation thereby.

4. In a tractor, a transverse work shaft, a change speed gear transmission mechanism adapted to establish a driving relation with said work shaft, a winch at an end of said work shaft adapted to be revolved thereby, planetary gearing in a portion of said winch adapted to operate said winch at a reduced speed relative to said work shaft, and means axially of said winch adapted for establishing a driving connection between said planetary gearing and said work shaft.

5. In a tractor housing, a transverse work shaft, means for revolving said work shaft, a winch at one end of said shaft, planetary gearing in a portion of said winch adapted to reduce the speed of said winch relative to said work shaft, means axially of said winch adapted for fixing said planetary gearing for operation by said work shaft.

6. Winch operating means comprising a change speed gear transmission mechanism, a work shaft adapted to be operated thereby, a winch at one end of said work shaft, a reduction gearing in a portion of said winch adapted to operate said winch at a reduced speed relative to said work shaft, and means axially of said winch including inner and outer intermediate friction members adapted to establish a driving relation between said work shaft and said reduction gearing.

7. Winch operating means comprising a work shaft, a winch, a reduction gear mechanism adapted to be operated by said work shaft to revolve said winch at a reduced speed relative to said work shaft, an inner clutch member in said winch carried by said work shaft, an outer clutch member in said winch carried by a portion of said reduction gear mechanism, and means axially of said winch adapted for shifting said outer clutch member to establish a driving relation between said work shaft and said reduction gear mechanism.

8. Winch operating means comprising a work shaft, a winch, means axially of said winch adapted for shifting said outer clutch member, and means between said outer and inner clutch members adapted for establishing a driving relation therebetween.

9. The combination of a work shaft adapted to be operated from a source of power, a change speed gear transmission mechanism adapted to establish variable speed driving relations between said work shaft and its source of power, a winch at an end of said work shaft, an outer shiftable clutch member in said winch adapted for rotation therewith, an inner clutch member on said work shaft, within said outer clutch member, means between said inner and outer clutch members adapted for establishing a driving relation therebetween, and means axially of said winch adapted for shifting said outer clutch member.

10. Auxiliary work mechanism for a tractor, comprising a change speed gear mechanism disposed on the tractor and including a work shaft, a winch having for its axis said work shaft, and means operable in the same axis adapted to establish a reduced driving relation between said winch and said work shaft.

In testimony whereof I affix my signature in the presence of two witnesses.

EDWIN R. EVANS.

Witnesses:
  KARL H. BUTLER,
  ANNA M. DORR.